March 31, 1953     H. C. RHODES     2,633,242
FLOUR DUSTER
Filed July 20, 1948     2 SHEETS—SHEET 1
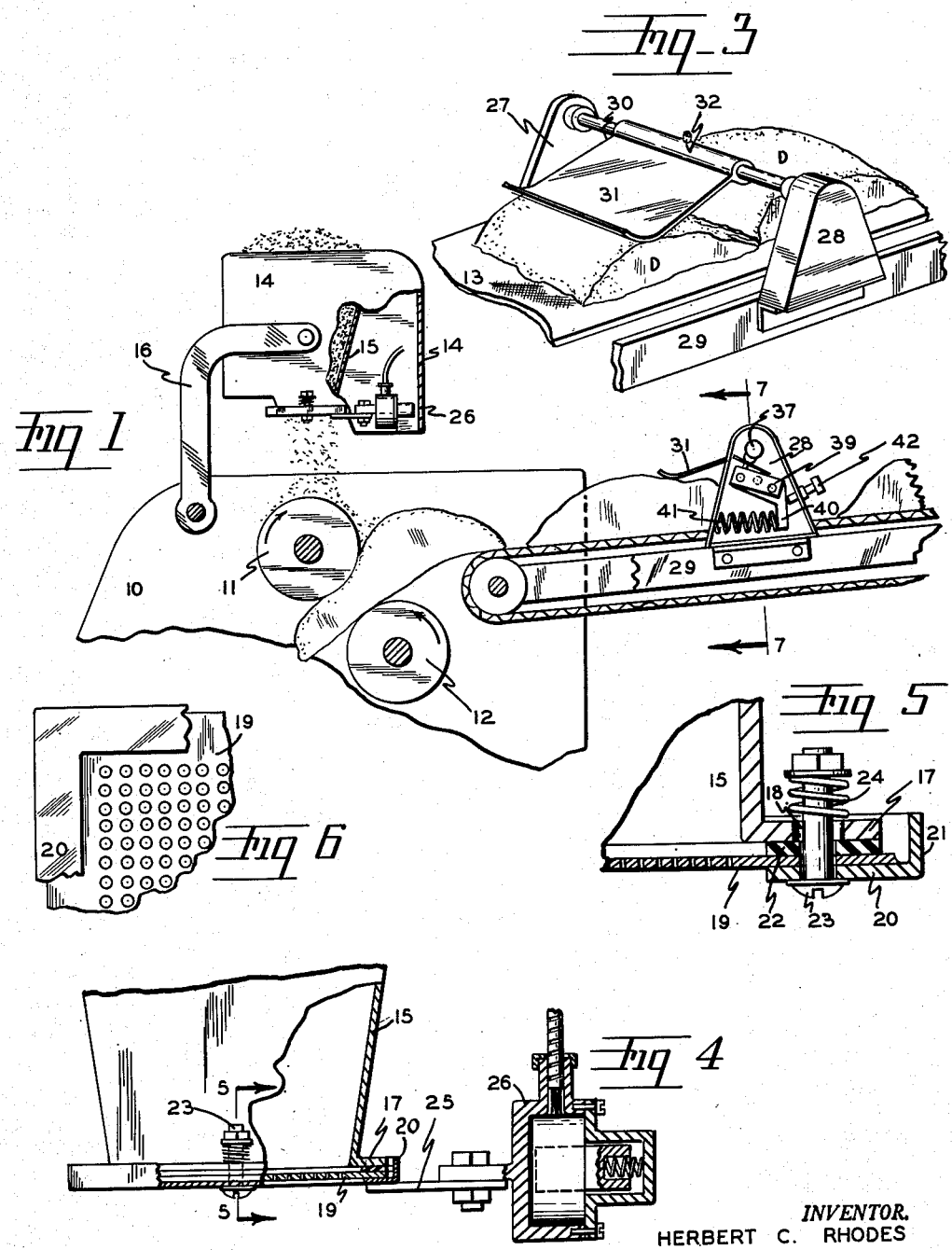
INVENTOR.
HERBERT C. RHODES
BY
ATTORNEY March 31, 1953 H. C. RHODES 2,633,242
FLOUR DUSTER
Filed July 20, 1948 2 SHEETS—SHEET 2
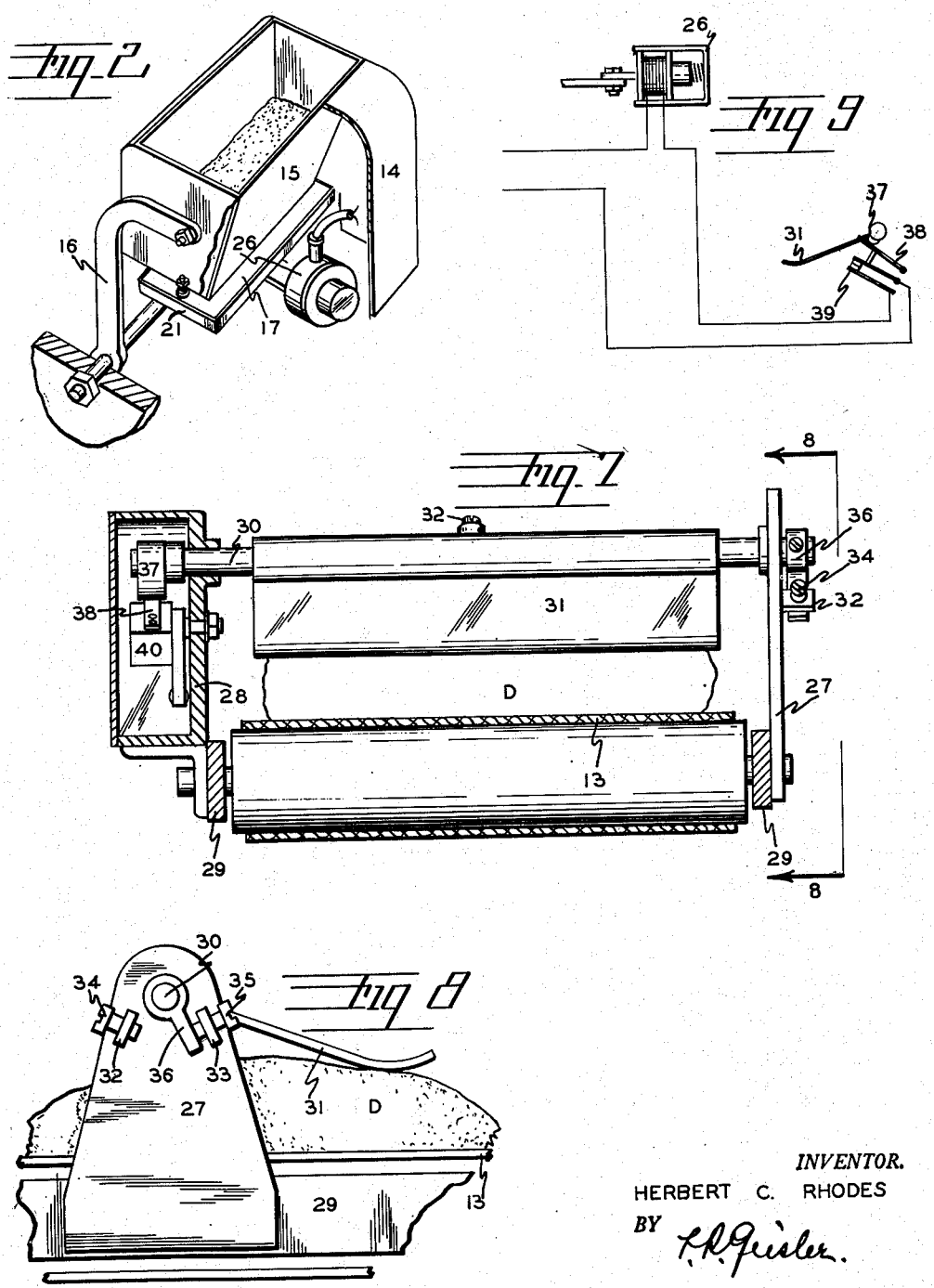
INVENTOR.
HERBERT C. RHODES
BY
ATTORNEY Patented Mar. 31, 1953

2,633,242

UNITED STATES PATENT OFFICE 2,633,242

FLOUR DUSTER

Herbert C. Rhodes, Portland, Oreg., assignor to Read Standard Corporation, a corporation of Delaware Application July 20, 1948, Serial No. 39,627

2 Claims. (Cl. 209—236)

This invention relates in general to means for dusting flour on dough, on dough molding rolls, on baking pans, etc., in the making of bread and other bakery products.

In particular, this invention relates to the dusting of a thin film or layer of flour, either on the molding rolls through which dough is required to pass, or on the dough itself as it passes through the rolls, to prevent the dough from sticking to the surface of the rolls.

While various devices have been developed previously for performing such flour dusting, to the best of my knowledge, and based on my experience with some of these devices which have been introduced into practice, there are certain objectionable features more or less common to all of them. One of these objectionable features is the fact that the flour is generally sifted onto the dough or rolls by mechanically operated sifters and with sifters of this type it is almost impossible to get a dusting of the flour which is uniform without being too heavy.

Another objectionable feature is the fact that if the sifting is performed constantly during the operation of the molding machine and rolls, considerable flour is wasted since the dough passes through the molding machine and rolls in separate pieces and not in one continuous piece, and the flour which is sifted in the intervals between the successive pieces is wasted. Some devices attempt to prevent such waste and to control the actuation of the mechanically operated sifters between the passage of the individual dough pieces, but the constant starting and stopping of such mechanical devices would necessarily result in excessive wear of such devices.

One of the objects of the present invention is to provide an improved flour duster from which a more uniform and thinner film of dusted flour can be obtained than from the various types of sifters heretofore employed.

Another object of this invention is to provide a flour duster which will be electrically operated and which can be repeatedly started and stopped without any excessive wear of any of the parts.

A further object of this invention is to provide an improved flour duster which can be automatically controlled and actuated by the passage of the pieces of dough through the dough molding machine or past the rolls, so that the dusting of the flour will take place only when needed, and thus any needless waste of the dusting flour can be avoided.

An additional object of this invention is to provide an automatic flour duster which will be relatively simple in construction, practical to operate, and which will require only a minimum amount of care in its operation and maintenance.

The above mentioned objects and other advantages I have been able to attain by providing an electrically vibrated flour dispensing means in which vibratory movement of the dispenser screen takes the place of the mechanically operated sifter scraper heretofore commonly employed, and for which I provide a simple and practical control for automatically controlling the operation of the vibrator mechanism, and by constructing and arranging the various parts of my improved flour duster as hereinafter briefly explained with reference to the accompanying drawings.

In the drawings:

Fig. 1 is a fragmentary side elevation, partly in section, and partly diagrammatic, of my flour duster illustrating the same in operation;

Fig. 2 is a view, in perspective, of the flour container, showing the electric vibrator attached to the bottom screen, a portion of the outer housing wall having been broken away for the sake of clarity;

Fig. 3 is a view, in perspective, of the control means for the flour duster;

Fig. 4 is an enlarged fragmentary elevation, partly in section, of the lower portion of the flour duster and vibrating mechanism;

Fig. 5 is a fragmentary vertical section taken on line 5—5 of Fig. 4, but drawn to a larger scale and illustrating the manner in which the screen and its frame in the duster are attached to the bottom flange of the flour hopper;

Fig. 6 is a fragmentary enlarged bottom plan view of a corner of the perforated plate or screen and its frame shown in Figs. 4 and 5;

Fig. 7 is an enlarged vertical section through the control means taken on the plane indicated by line 7—7 of Fig. 1;

Fig. 8 is a side elevation of the control means taken from the side indicated by the line 8—8 of Fig. 7; and Fig. 9 is a wiring diagram illustrating the electric circuit in which the control means and the electric vibrating means are connected.

Referring first to Fig. 1, the reference character 10 indicates a portion of the housing of a dough molding machine of any of the various well known types, in which machine dough rolls operate, two such dough rolls being diagrammatically illustrated at 11 and 12. The dough, indicated by D, is delivered from the dough mixer (not shown) on to an endless traveling belt 13

(see also Fig. 3) by which the dough is conveyed into the dough molding machine and is fed to the dough molding rolls, such as the rolls 11 and 12 indicated in Fig. 1. In order to prevent the dough from sticking to the surface of the rolls, particularly from the surface of the first upper roll indicated at 11, it is customary to dust either the roll or the surface of the dough with a thin film of flour. In the device illustrated in Fig. 1 this dusting is provided primarily on the roll 11.

A flour container comprising an outer housing 14 with an inner hopper 15 is supported at each side on a pair of bracket arms 16, respectively, one of which arms is shown in the drawings. The bracket arms 16 in turn are supported in any suitable manner in the upper portion of the molding machine 10. The housing 14 of the flour container is open at the bottom. A perforated or screen plate 19 (Figs. 4 and 5) forms the bottom wall for the hopper 15. The manner in which this bottom perforated or screen plate is mounted at the bottom of the hopper will now be explained.

Referring to Figs. 2, 4 and 5, a horizontal flange 17 extends around the bottom of the side walls of the hopper 15. Holes are provided in the flange 17 at opposite sides of the hopper, such as the hole 18 shown in Fig. 5, to enable the bottom plate to be attached to the hopper by suitable bolts extending through holes in the flange. The bottom plate 19, as shown more clearly in Figs. 5 and 6, is formed with a large number of small perforations so that this plate serves the same purpose as a screen of fine mesh in permitting a sifting of flour therethrough under certain conditions. The perforated or screen bottom plate 19 is mounted in a rectangular frame 20, the outer rim of which is bent upwardly at an angle of 90° to form the vertical flange 21 (Fig. 5) for the purpose of adding rigidity to the frame. This outer flange 21 is located a slight distance outwardly from the outer edge of the hopper flange 17 so as to permit slight lateral movement of the bottom plate 19 and its frame 20 with respect to the hopper 15. When the bottom plate 19 and its frame 20 are attached to the hopper flange 17, a rectangular cushioning washer 22, of rubber or other resilient cushioning material, is preferably interposed between the bottom plate and the hopper flange, as shown in Fig. 5. The bottom plate and frame are attached to the hopper by bolts 23, and coil springs 24 are placed on the bolts and held under compression between the top face of the flange 17 and the bolt nuts. It will be noted from Fig. 5 that the holes 18 in the flange 17, through which the bolts 23 extend, are considerably larger in diameter than the bolts themselves and thus permit lateral movement in any direction of the bottom plate and its frame with respect to the hopper.

An arm 25 (Fig. 4) is rigidly attached to the frame 20 of the bottom plate 19, and a small electric vibrator, indicated in general by the reference character 26, has a flange by which the vibrator housing is securely bolted to the arm 25. The vibrator 26 is a simple, small, alternating current vibrator of well known construction including a movable, spring-loaded center member extending through the center of a surrounding wire coil and thus given rapid longitudinal vibration whenever the electric current passes through the coil. This rapid vibration is transmitted from the vibrator housing through the arm 25 to the frame 20 and perforated screen plate 19, and the effect of such transmitted vibration on the screen plate 19 is to cause a fine sifting of flour from the hopper through the perforations of the screen plate as long as the vibration is maintained. Due to the small size of the perforations in the plate 19, however, this sifting of flour through the perforations will cease the moment the vibrations stop. The actual vibratory movement of the perforated plate 19 is very slight, but also very rapid, and due to the nature of this vibration and also to the manner in which the plate 19 and its frame 20 are mounted on the bottom of the hopper 15, the amount of vibration imparted to the hopper itself is practically insignificant. This employment of a vibrating perforated plate or screen in place of the customary flour sifter, with its moving scraper element, comprises a main feature of my invention.

Through this medium of a vibrating screen a finer and more even dusting of the flour can be obtained than I have found it possible to obtain with the familiar types of flour sifters. A common, simple electric vibrator, of the type indicated, will last for a long time without requiring any attention whatsoever, and should it wear out it can easily and quickly be replaced at very nominal cost. Due to the manner in which the perforated plate is mounted, the amount of wear on the associated parts and care required in maintaining the entire device in operable condition will be very little. Unlike the flour sifters or dusters heretofore employed in dough molding machines, the repeated starting and stopping of the flour dusting means does not present any problem, and consequently the flour dusting can be made to take place only as the actual dusting is required.

For controlling the dusting operation, in other words, for controlling the actuation of the vibrating mechanism, I provide a simple control means which is made to operate automatically by the passage of the dough into the molding machine. Referring now to Figs. 1, 3, 7 and 8, a bracket 27 and a bracket in the form of a housing 28 are secured to the opposite sides of the frame assembly 29 which supports the endless traveling belt 13 and its rollers. A shaft 20 is rotatably journaled in the brackets 27 and 28 as shown in Fig. 7. A dough-engageable trip plate 31 is adjustably but rigidly attached on the shaft 30 by a set screw 32, and, as apparent from the figures, will be raised whenever the dough, moving with the traveling belt 13, encounters this trip plate 31. The lifting of the trip plate 31 will cause partial rotation of the shaft 30 in one direction, and the dropping of the trip plate when the dough ceases to pass beneath it will produce corresponding partial rotation of the shaft 30 in the opposite direction. The trip plate 31 is formed preferably of a light sheet of stainless steel or aluminum or other suitable metal or plastic, and the bottom end is preferably curved in the direction of travel of the dough so as to facilitate the sliding of the dough under the free end of the plate as the end rests on the dough.

The bracket 27 (Figs. 7 and 8) is formed with a pair of lugs 32 and 33 on its outer face and set screws 34 and 35 are adjustably mounted in these lugs respectively. A radius arm 36 is secured to the end of the shaft 30 by a set screw, and engagement of this arm 36 with either of the set screws 34 or 35 will limit the rotation of the shaft in that particular direction and thus limit the movement or swing of the trip plate 31. With the rapid and intermittent passing of separate pieces of dough of various thickness beneath the trip plate 31 there might be a possibility of the plate 31 swinging too far around when suddenly encountered by a piece of the dough or when suddenly released from such encounter, and the set screws 34 and 35 accordingly act as limit screws to limit the swing of the trip plate to a predetermined arc.

On the opposite end of the shaft 30, and within the bracket housing 28, a cam 37 (Figs. 1 and 7) is secured to the shaft 30. A flat spring 38 bears against the periphery of the cam 37 and the flat spring 38 in turn operates a spring contact arm of a simple switch 39. The switch 39 is carried on a pivotally mounted bracket 40 (Fig. 1) and the position of this bracket 40 is adjustably controlled by means of a spring 41 and set screw 42. The switch 39, as diagrammatically illustrated in Fig. 9, is connected in the electric circuit to the vibrator 26 so that the circuit to the vibrator will be closed whenever the cam 37 and its spring follower 38 temporarily force the switch 39 into closed position. Thus, as apparent from Figs. 1 and 9, the lifting of the trip plate 31 by the passing of a piece of dough beneath the plate will close the switch 39 and cause the vibrator 26 to operate, and when the piece of dough has moved out of contact with the trip plate 31, permitting the trip plate to drop down to its normal position, the switch 39 will immediately return to its normal open position breaking the circuit to the vibrator and stopping the operation of the vibrator.

In the device constructed as I have illustrated, various adjustments can be made in order to modify the relative length of the periods of operation of the vibrator for each piece of dough. Thus the device can be so adjusted that the vibrator will be caused to operate only during the relatively short interval when the trip plate 31 has been lifted approximately to the top of the piece of dough. Similarly the device can be so adjusted that the operation of the vibrator will start with the slightest lifting of the trip plate 31 and thus can be made to operate for the entire period during which the rounded piece of dough is in contact with the trip plate 31. Such adjustment can be made by changing the position of the pivoted bracket 40 by means of the set screw 42 (Fig. 1) so that the switch will be closed for a longer period during the partial rotation of the cam 37 produced by the lifting of the plate 31. A similar adjustment can be made by adjusting the trip plate 31 on the shaft 30 by means of the set screw 32. The speed with which the conveyor belt 13 moves will be a factor to be considered, and, for maximum efficiency, the device should be so adjusted that the flour dust, dropping from the vibrating bottom plate of the hopper, will reach the rotating roll 11 no sooner than necessary and will not continue longer than necessary. I have found with the operation of my device that these desired adjustments can easily be made with considerable accuracy so that any excessive or unnecessary dusting will be eliminated.

In Fig. 1 I have illustrated the dusting of the flour as taking place on the roll 11, some of the flour dust also passing on to the lower roll 12, just before the dough reaches the rolls. The dusting of the flour could also take place directly on the dough itself if preferred. Similarly, my invention could be used for dusting the top of molded dough pieces as they pass to the baking oven whenever dusting of the dough just prior to baking is desired.

Various modifications could be made in the construction of the device which I have illustrated and described, and also in the different parts of the same, within the scope of my invention. The particular device as described I have found, however, to be very satisfactory for carrying out the purposes of my invention, and I regard this as the preferred embodiment of my invention. However, it is not my intention to limit my invention except as set forth in the claims.

I claim:

1. In a dough working machine, a flour duster comprising a hopper, said hopper including an outwardly projecting flange formed on the sides and adjacent the bottom thereof, a frame disposed in underlying parallel spaced relation with respect to said flange, a perforated plate interposed between said flange and frame and constituting the bottom of said hopper, means pendently supporting said plate and frame as a unit from said flange in transverse slidable engagement therewith, and means for reciprocating said plate and frame as a unit.

2. In a dough working machine a flour duster comprising a hopper the sides of which terminate in an outwardly projecting flange, a frame of a configuration complementary to said flange positioned beneath said flange in spaced parallel relation, a perforated plate interposed between said flange and frame and defining a bottom for said hopper, a resilient cushioning member interposed between said plate and flange, said flange, resilient member, plate and frame having aligned apertures formed therein with the aperture in said flange being of a larger diameter than the diameter of the apertures in said rubber member, plate and frame, bolts extending through said apertures for supporting said frame, plate and rubber member as a unit from said flange and means for actuating said frame and plate as a unit with respect to said flange.

HERBERT C. RHODES.

REFERENCES CITED

The following references are of record in the file of this patent:

UNITED STATES PATENTS

| Number | Name | Date |
|---|---|---|
| 1,746,958 | Naab | Feb. 11, 1930 |
| 1,970,336 | Pointon | Aug. 14, 1934 |
| 2,066,899 | Parsons | Jan. 5, 1937 |
| 2,142,373 | Plambeck | Jan. 3, 1939 |
| 2,284,943 | Brace | June 2, 1942 |
| 2,390,195 | Tasher | Dec. 4, 1945 |